United States Patent
Takagi et al.

(10) Patent No.: US 11,958,195 B2
(45) Date of Patent: Apr. 16, 2024

(54) DETECTION SYSTEM, TRANSPORT SYSTEM, DETECTION METHOD, AND DETECTION PROGRAM

(71) Applicant: TOYOTA JIDOSHA KABUSHIKI KAISHA, Toyota (JP)

(72) Inventors: Yutaro Takagi, Tokyo (JP); Kunihiro Iwamoto, Nagakute (JP); Yuta Itozawa, Nagoya (JP); Hirotaka Komura, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/534,363

(22) Filed: Nov. 23, 2021

(65) Prior Publication Data

US 2022/0241966 A1  Aug. 4, 2022

(30) Foreign Application Priority Data

Feb. 4, 2021  (JP) .................................. 2021-016919

(51) Int. Cl.
  *B25J 9/16*  (2006.01)
  *G05B 19/418*  (2006.01)
(52) U.S. Cl.
  CPC ........ *B25J 9/1656* (2013.01); *G05B 19/4189* (2013.01); *G05B 2219/40425* (2013.01)

(58) Field of Classification Search
  None
  See application file for complete search history.

(56) References Cited

U.S. PATENT DOCUMENTS

| | | | |
|---|---|---|---|
| 2008/0294287 A1 | 11/2008 | Kawano et al. | |
| 2016/0159496 A1* | 6/2016 | O'Toole | A47G 29/141 244/110 E |
| 2018/0314265 A1* | 11/2018 | Matsuno | G05D 1/0274 |
| 2019/0194971 A1 | 6/2019 | Shinnaka et al. | |
| 2022/0203527 A1* | 6/2022 | Komura | B25J 9/0003 |
| 2022/0258347 A1* | 8/2022 | Itozawa | B25J 18/025 |

FOREIGN PATENT DOCUMENTS

| | | |
|---|---|---|
| CN | 102803101 A | 11/2012 |
| CN | 211053742 U | 7/2020 |
| JP | H07040274 A | 2/1995 |
| JP | H09171408 A | 6/1997 |
| JP | 2001287183 A | 10/2001 |
| JP | 2004126800 A | 4/2004 |
| JP | 2009001425 A | 1/2009 |
| WO | 2011008479 A2 | 1/2011 |

* cited by examiner

*Primary Examiner* — K. Wong
(74) *Attorney, Agent, or Firm* — Dickinson Wright, PLLC

(57) ABSTRACT

An embodiment of the present disclosure relates to a detection system used in a case where a transport robot transports a package in a state where the package in which an opening portion of a container is closed by a lid is placed on a placing portion of the transport robot. The detection system is configured to detect that the lid is opened.

7 Claims, 4 Drawing Sheets

DETECTION SYSTEM, TRANSPORT SYSTEM, DETECTION METHOD, AND DETECTION PROGRAM

CROSS-REFERENCE TO RELATED APPLICATION

This application claims priority to Japanese Patent Application No. 2021-016919 filed on Feb. 4, 2021, incorporated herein by reference in its entirety.

BACKGROUND

1. Technical Field

The present disclosure relates to a detection system, a transport system, a detection method, and a detection program, for example, a detection system, a transport system, a detection method, and a detection program used in a case where a transport robot transports a package in a state where the package in which an opening portion of a container is closed by a lid is placed on a placing portion of the transport robot.

2. Description of Related Art

In recent years, in factories or warehouses, a technique for transporting a package by an autonomously mobile transport robot has been developed. For example, Japanese Unexamined Patent Application Publication No. 2001-287183 (JP 2001-287183 A) discloses a transport robot having a containing portion provided with a containing door that can be opened and closed. Such a transport robot is configured to control a lock unit such that the containing door can be opened by executing a confirmation of an arrival of the transport robot at a designated target position and a confirmation of the transport robot by a handling registrant.

SUMMARY

The present applicants have found the following problem. For example, in a case where a package in which an opening portion of a container is closed by a lid is transported in a state of being placed on a transport robot, the lid may be opened by another person, but a detection cannot be made that the lid is opened.

The present disclosure has been made in view of such a problem, and realize a detection system, a transport system, a detection method, and a detection program that enable to detect that the lid is opened in a case where the package in which the opening portion of the container is closed by the lid is transported.

A first aspect of the present disclosure relates to a detection system used in a case where a transport robot transports a package in a state where the package in which an opening portion of a container is closed by a lid is placed on a placing portion of the transport robot. The detection system is configured to detect that the lid is opened.

The detection system according to the first aspect may include an optical sensor provided on the transport robot to detect the lid in a state where the package is placed on the placing portion and including a light source and a light receiving unit configured to receive reflection light of emission light from the light source, the reflection light being reflected by the lid, and a determination unit configured to determine whether or not the lid is opened based on a result of detection by the optical sensor.

In the detection system according to the first aspect, a flange portion on which the lid is placed may be formed on a periphery of the opening portion of the container, and a penetrating portion through which the emission light of the optical sensor passes may be formed in the flange portion.

The detection system according to the first aspect may include a weight sensor configured to detect a weight on the placing portion, and a determination unit configured to determine whether or not the lid is opened based on a result of detection by the weight sensor.

The detection system according to the first aspect may include a notification unit configured to, in a case where a determination is made that the lid is opened, give a notification that the lid is opened to an outside of the transport robot.

A second aspect of the present disclosure relates to a transport system including the detection system according to the first aspect, the package, the transport robot configured to transport the package, and a control device configured to control the transport robot.

A third aspect of the present disclosure relates to a detection method used in a case where a transport robot transports a package in a state where the package in which an opening portion of a container is closed by a lid is placed on a placing portion of the transport robot. The detection method includes detecting that the lid is opened based on a result of detection of reflection light of emission light from a light source, the reflection light being reflected by the lid or a result of detection of a weight on the placing portion.

A fourth aspect of the present disclosure relates to a detection program used in a case where a transport robot transports a package in a state where the package in which an opening portion of a container is closed by a lid is placed on a placing portion of the transport robot. The detection program causes a computer to execute a process comprising detecting that the lid is opened based on a result of detection of reflection light of emission light from a light source, the reflection light being reflected by the lid, or a result of detection of a weight on the placing portion.

According to the present disclosure, it is possible to realize a detection system, a transport system, a detection method, and a detection program that enable to detect that the lid is opened in a case where the package in which the opening portion of the container is closed by the lid is transported.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. Note that the present disclosure is not limited to the following embodiments. In addition, in order to clarify the description, the following description and drawings have been simplified as appropriate.

First Embodiment

Figure 1:
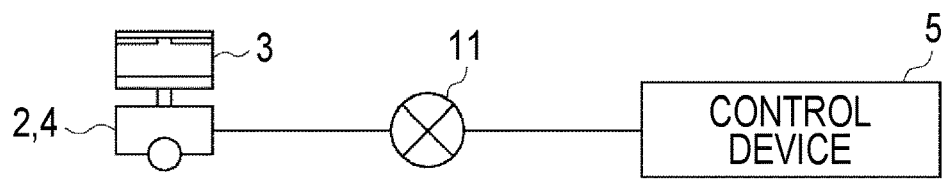
FIG. 1 is a configuration diagram showing components of a transport system according to a first embodiment.

A transport system according to the present embodiment is suitable, for example, in a case where a transport robot transports a package. FIG. 1 is a configuration diagram showing components of the transport system according to the present embodiment. As shown in FIG. 1, a transport system 1 includes a transport robot 2, a package 3, a detection system 4, and a control device 5.

Figure 2:
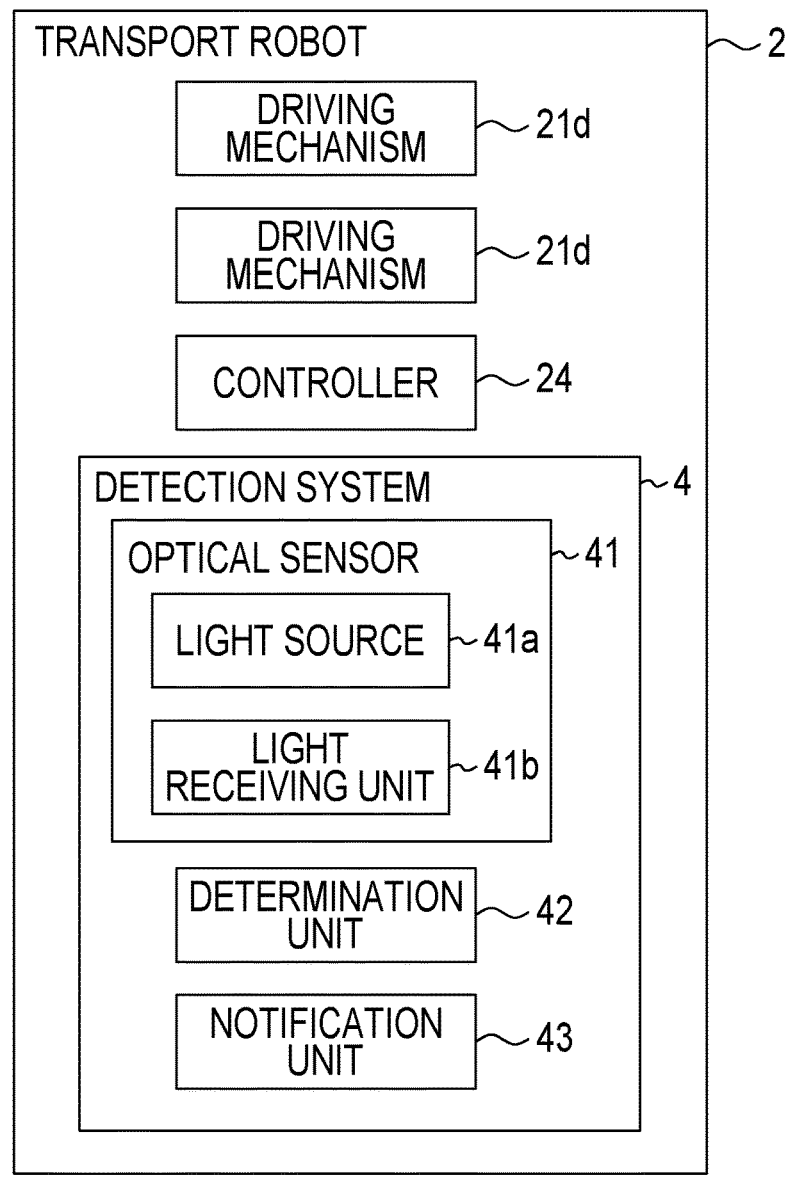
FIG. 2 is a block diagram showing a control system of a transport robot and a detection system according to the first embodiment.
Figure 3:
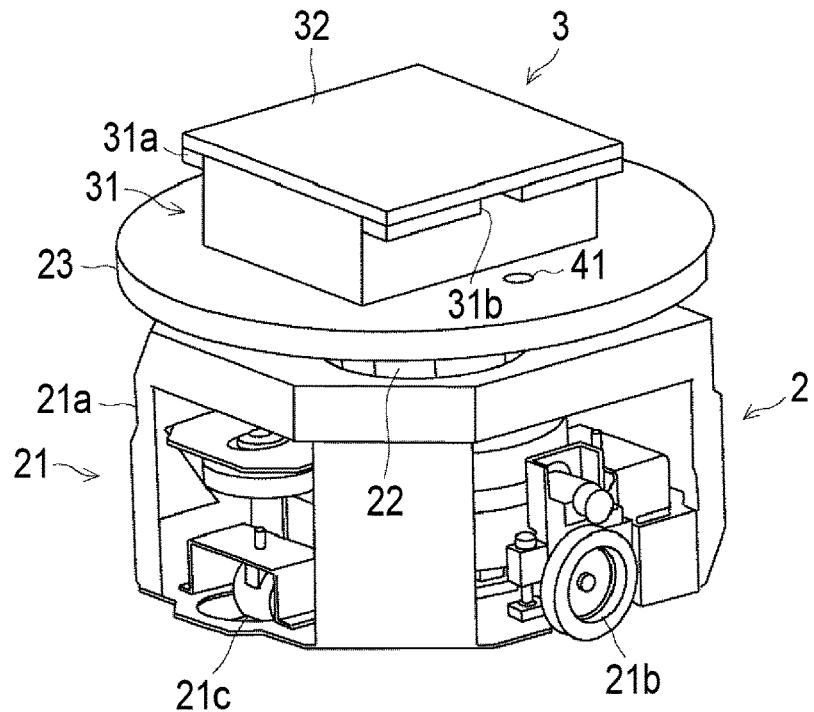
FIG. 3 is a perspective view schematically showing the transport robot according to the first embodiment.
Figure 4:
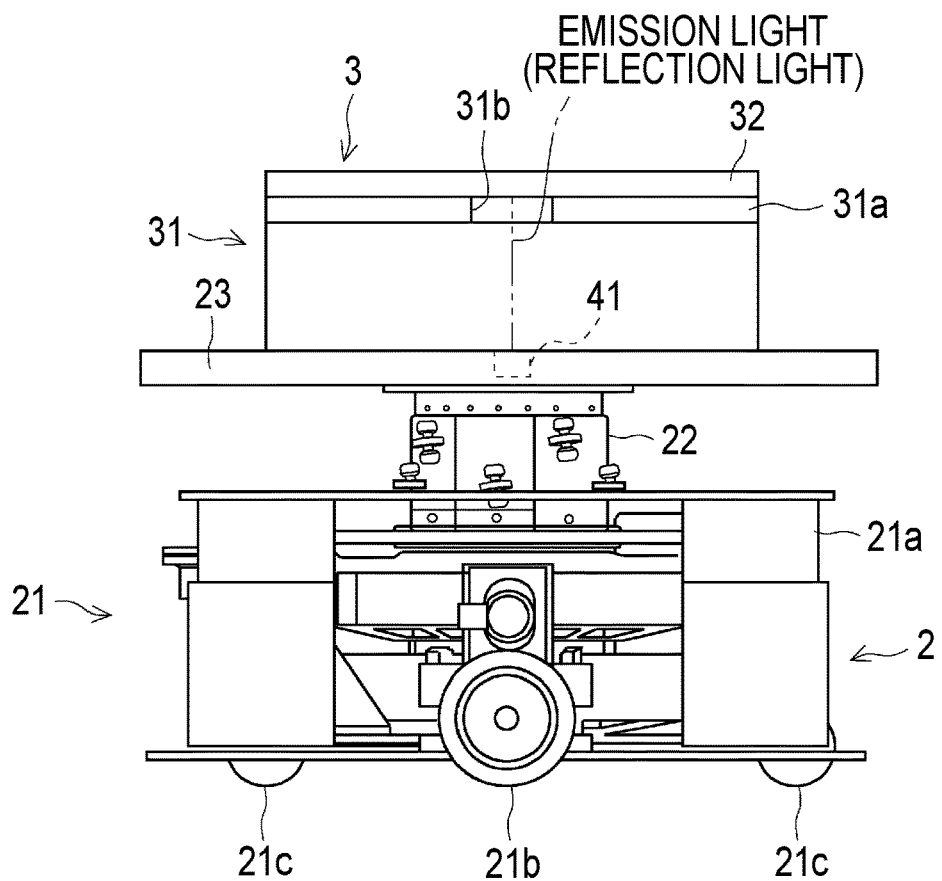
FIG. 4 is a side view schematically showing the transport robot according to the first embodiment.

FIG. 2 is a block diagram showing a control system of the transport robot and the detection system according to the present embodiment. FIG. 3 is a perspective view schematically showing the transport robot according to the present embodiment. FIG. 4 is a side view schematically showing the transport robot according to the present embodiment. Here, FIGS. 3 and 4 show the transport robot 2 in a state where the package 3 is placed on a placing portion 23 of the transport robot 2. In addition, in FIG. 4, emission light and reflection light are shown by a two-dot chain line.

The transport robot 2 is, for example, an autonomous mobile robot. As shown in FIGS. 1 to 4, the transport robot 2 includes a movement portion 21, a support portion 22, a placing portion 23, and a controller 24, and is connected to a network 11. Here, the network 11 is, for example, the Internet, and is constructed of a telephone network, a wireless communication channel, Ethernet (registered trademark), and the like.

As shown in FIGS. 2 to 4, the movement portion 21 includes a robot body 21a, a pair of right and left driving wheels 21b provided to be rotatable on the robot body 21a, a pair of front and rear driven wheels 21c, and a pair of driving mechanisms 21d that rotationally drives each of the driving wheels 21b.

The driving mechanism 21d includes a motor, a speed reducer, and the like. The driving mechanism 21d drives the robot body 21a based on control information received from the controller 24 to cause each of the driving wheels 21b to rotate, so that the robot body 21a can move forward, move backward, and rotate.

As a result, the robot body 21a can move to any position. Incidentally, a configuration of the movement portion 21 is an example, and the present disclosure is not limited thereto. For example, the number of the driving wheels 21b and the driven wheels 21c of the movement portion 21 may be any number, and a known mechanism can be used as long as the robot body 21a can move to any position.

The support portion 22 protrudes upward from the robot body 21a. It is desirable that the support portion 22 be configured by, for example, a telescopic type expansion and contraction mechanism and can be expanded and contracted in a vertical direction. The placing portion 23 is fixed to an upper end portion of the support portion 22, and an upper surface of the placing portion 23 has a flat surface on which the package 3 is placed.

The controller 24 controls an operation of the transport robot 2 based on the control information received from the control device 5. That is, the controller 24 controls the rotation of each of the driving wheels 21b by transmitting the control information to the driving mechanism 21d of the movement portion 21, and causes the robot body 21a to move to any position.

Here, the controller 24 may control the movement of the transport robot 2 by executing a known control, such as a feedback control and a robust control, based on rotation information of the driving wheels 21b detected by rotation sensors provided on the driving wheels 21b.

In addition, the controller 24 may cause the transport robot 2 to autonomously move by controlling the movement portion 21 based on information, such as distance information detected by a distance sensor, such as a camera or an ultrasound sensor, provided on the transport robot 2 or map information of a movement environment.

Incidentally, the transport robot 2 may be provided with an arm mechanism that carries the package 3 in the placing portion 23 and carries the package 3 out the placing portion 23. Note that a method of carrying the package 3 in the placing portion 23 of the transport robot 2 and carrying the package 3 out the placing portion 23 is not limited, and may be executed by a person.

Figure 5:
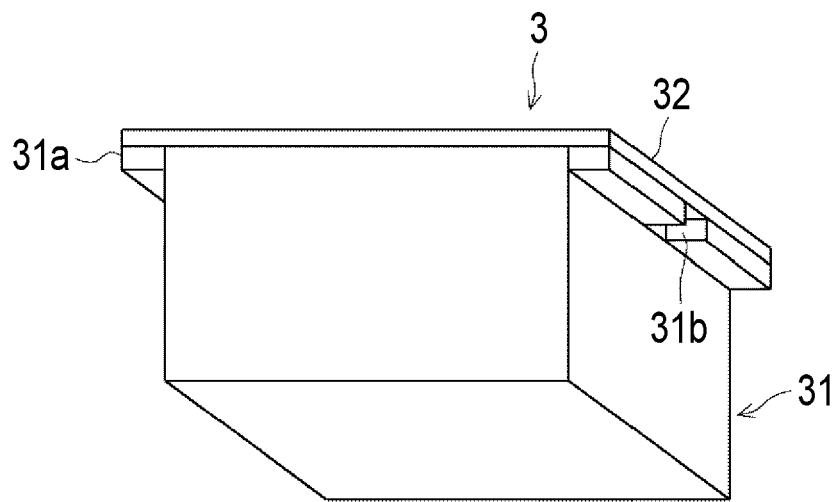
FIG. 5 is a perspective view showing a package according to the first embodiment.

FIG. 5 is a perspective view showing the package according to the present embodiment. The package 3 can contain an object to be contained inside the package 3, and includes a container 31 and a lid 32 as shown in FIG. 5. The container 31 basically has a box shape having an opening portion on an upper side of the container 31, and has, for example, a rectangular shape when the container 31 is viewed from the vertical direction. Note that the container 31 need only have a shape that can contain the object to be contained inside the container 31.

A flange portion 31a that protrudes to an outside from the container 31 is formed on a periphery of the opening portion of the container 31. As shown in FIG. 5, for example, the flange portion 31a is formed on each of facing sides of the container 31. Note that the flange portion 31a need only be disposed to be capable of supporting the lid 32 as described below.

Although a detailed function will be described below, a penetrating portion 31b is formed in the flange portion 31a. The penetrating portion 31b penetrates the flange portion 31a in the vertical direction. The penetrating portion 31b is formed, for example, by cutting out the flange portion 31a. Such a penetrating portion 31b need only be disposed at one or a plurality of locations in the flange portion 31a.

The lid 32 covers the opening portion of the container 31. The lid 32 is supported by the flange portion 31a of the container 31 in a state of covering the opening portion of the container 31. The lid 32 has, for example, a rectangular shape when viewed from the vertical direction of the container 31, and has a shape that can cover the flange portion 31a and the penetrating portion 31b.

As shown in FIG. 2, the detection system 4 includes an optical sensor 41 and a determination unit 42, and is placed on, for example, the transport robot 2. The optical sensor 41 includes a light source 41a and a light receiving unit 41b. The light source 41a emits directional light, such as laser light.

The light source 41a is fixed to, for example, the placing portion 23 of the transport robot 2, and emits the emission light upward. The light receiving unit 41b detects the reflection light of the emission light emitted from the light source 41a. The light receiving unit 41b is fixed to, for example, the placing portion 23 of the transport robot 2 to be adjacent to the light source 41a.

Although the details will be described below, the determination unit 42 determines whether or not the lid 32 of the package 3 is opened based on a result of detection by the light receiving unit 41b of the optical sensor 41. The control device 5 is connected to the network 11, and for example, controls the transport robot 2 to execute a task of transporting the package 3 based on a task command input by a user of the transport robot 2 via an input unit (not shown).

Figure 6:
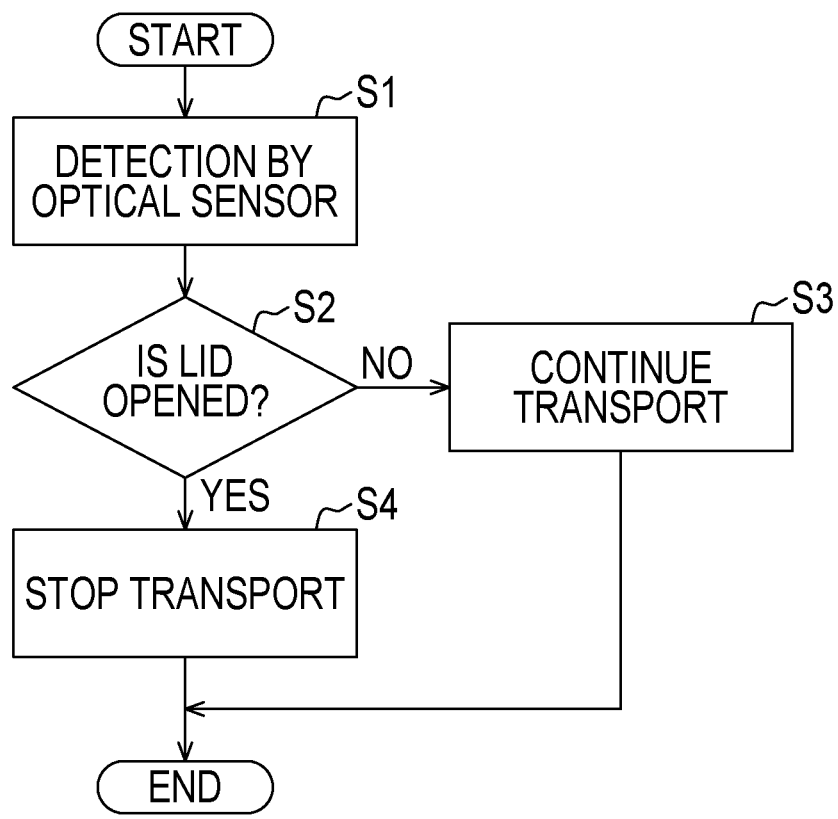
FIG. 6 is a flowchart showing a flow of a determination as to whether or not a lid of the package is opened while the transport robot transports the package by using the detection system according to the first embodiment.

Next, a flow of a determination as to whether or not the lid 32 of the package 3 is opened while the transport robot 2 transports the package 3 by using the detection system 4 according to the present embodiment will be described. FIG. 6 is a flowchart showing the flow of the determination as to whether or not the lid of the package is opened while the transport robot transports the package by using the detection system according to the present embodiment.

First, a flow until transport of the package 3 is started will be described. For example, when the user of the transport robot 2 inputs the task command for transporting the package 3 via the input unit, the control device 5 transmits the control information for transporting the package 3 to the transport robot 2. Here, a route for transporting the package 3 may be either a preset route or a route set by the user via the input unit.

When the controller 24 of the transport robot 2 receives the control information from the control device 5, the controller 24 enters a standby state for transporting the package 3 and controls the optical sensor 41 such that a detection operation of the optical sensor 41 is started. Then, the user places the package 3 on the placing portion 23 of the transport robot 2 such that the penetrating portion 31b formed in the flange portion 31a of the package 3 is disposed substantially directly above the light source 41a of the optical sensor 41.

Here, it is desirable that the transport robot 2 include a mechanism capable of fixing the package 3 to the placing portion 23 in a state where the penetrating portion 31b formed in the flange portion 31a of the package 3 is disposed substantially directly above the light source 41a of the optical sensor 41.

The emission light emitted from the light source 41a of the optical sensor 41 passes through the penetrating portion 3 lb of the package 3, is reflected by a lower surface of the lid 32, and is incident on the light receiving unit 41b. As a result, the light receiving unit 41b of the optical sensor 41 detects the reflection light reflected by the lid 32 of the package 3. Then, the determination unit 42 determines that the lid 32 of the package 3 is not opened based on the result of detection of the light receiving unit 41b of the optical sensor 41.

The controller 24 of the transport robot 2 recognizes that the package 3 is placed on the placing portion 23 based on a result of determination of the determination unit 42, and controls the driving mechanism 21d of the movement portion 21 for transporting package 3. As a result, the transport robot 2 starts the transport of the package 3.

As described above, in a state where the package 3 is transported by the transport robot 2, the controller 24 of the transport robot 2 controls the optical sensor 41 such that the detection operation of the optical sensor 41 is continued (S1). Then, the determination unit 42 determines whether or not the lid 32 of the package 3 is opened based on the result of detection of the light receiving unit 41b of the optical sensor 41 (S2).

In a case where the light receiving unit 41b of the optical sensor 41 detects the reflection light reflected by the lid 32 of the package 3, the determination unit 42 determines that the lid 32 of the package 3 is not opened (NO in S2). In this case, the controller 24 of the transport robot 2 controls the driving mechanism 21d of the movement portion 21 based on the result of determination of the determination unit 42 such that the transport of the package 3 is continued (S3).

Thereafter, when the transport robot 2 arrives at a transport destination of the package 3 (that is, a goal point of the route), the controller 24 of the transport robot 2 transmits information that the transport robot 2 arrives at the transport destination of the package 3 to the control device 5. Then, when the control device 5 transmits the control information to the controller 24 of the transport robot 2 such that the transport of the package 3 is terminated, the transport of the package 3 by the transport robot 2 is terminated.

On the other hand, in a case where the light receiving unit 41b of the optical sensor 41 does not detect the reflection light reflected by the lid 32 of the package 3, the determination unit 42 determines that the lid 32 of the package 3 is opened (YES in S2). As described above, the optical sensor 41 can be used to detect (recognize) that the lid 32 of the package 3 is opened.

In this case, the controller 24 of the transport robot 2 can control the driving mechanism 21d of the movement portion 21 based on the result of determination of the determination unit 42 such that the transport of the package 3 is stopped (S4). Note that the controller 24 of the transport robot 2 may control the driving mechanism 21d of the movement portion 21 such that the transport of the package 3 is continued.

Here, it is desirable that the controller 24 of the transport robot 2 transmit the information that the lid 32 of the package 3 is opened to the control device 5. Then, it is desirable that the control device 5 transmit, for example, the information that the lid 32 of the package 3 is opened to a portable terminal owned by the user. As a result, the user can recognize that the lid 32 of the package 3 is opened. That is, the portable terminal of the user can function as a notification unit that gives a notification that the lid 32 of the package 3 is opened.

In addition, in a case where the detection system 4 includes a notification unit 43, such as a speaker or a lighting device, the notification unit 43 may be operated to notify a person around (that is, outside) the transport robot 2 that the lid 32 of the package 3 is opened.

For example, in a case where the notification unit 43 is the speaker, the notification unit 43 need only output a voice "please close the lid of the package", and when the notification unit 43 is the lighting device, the notification unit 43 need only turn the light source on or off. As a result, it is possible to notify the person around the transport robot 2 that the lid 32 of the package 3 is opened. Note that the notification unit 43 can use a known configuration as long as the notification unit 43 can notify the person around the transport robot 2 that the lid 32 of the package 3 is opened.

As described above, the detection system 4, the transport system 1, and the detection method according to the present embodiment enable to detect that the lid 32 of the package 3 is opened. Moreover, it is possible to easily detect that the lid 32 of the package 3 is opened by using the optical sensor 41.

In addition, the detection system 4 gives the notification that the lid 32 of the package 3 is opened to the outside by transmitting the information that the lid 32 of the package 3 is opened to the portable terminal of the user or operating a warning device, it is possible to notify the user or the person around the transport robot 2 that the lid 32 of the package 3 is opened.

Second Embodiment

Figure 7:
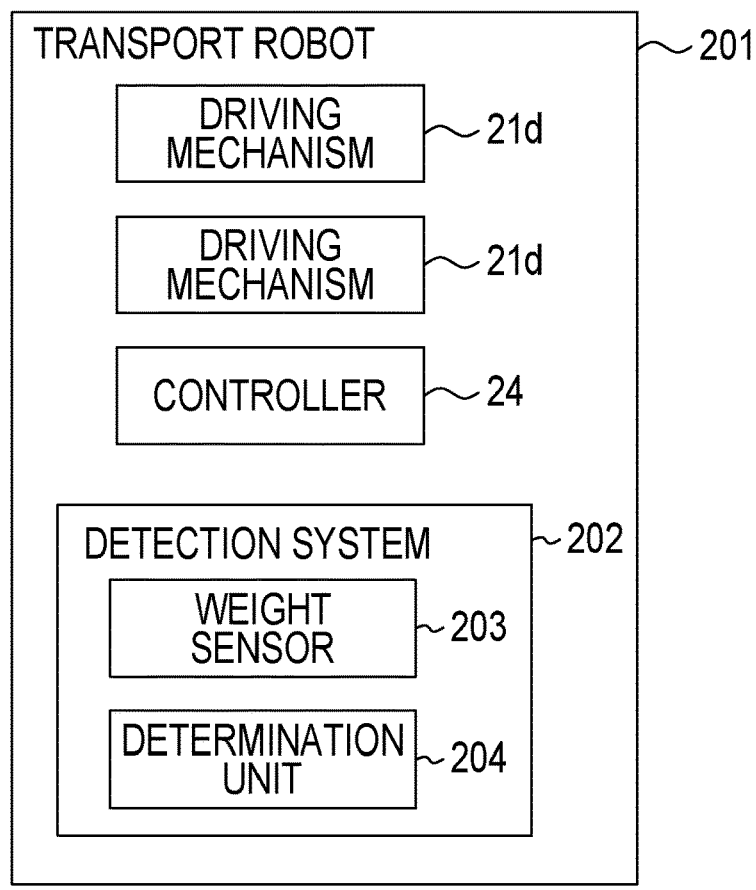
FIG. 7 is a block diagram showing a control system of a transport robot and a detection system according to a second embodiment.

FIG. 7 is a block diagram showing a control system of a transport robot and a detection system according to the present embodiment. The transport system according to the present embodiment has substantially the same configuration as the transport system 1 according to the first embodiment, but a configuration of a detection system 202 is different. Incidentally, the description that overlaps with the first embodiment will be omitted, and the same elements as those of the first embodiment will be described by using the same reference signs.

The detection system 202 is installed on a transport robot 201, for example, as shown in FIG. 7, and includes a weight sensor 203 and a determination unit 204. The weight sensor 203 is provided, for example, on the placing portion 23 such that a weight of the package 3 placed on the placing portion 23 of the transport robot 201 can be measured. Note that an installation position of the weight sensor 203 on the transport robot 201 is not limited as long as the weight sensor 203 can measure the weight of the package 3 placed on the placing portion 23.

The determination unit 204 determines that the lid 32 of the package 3 is opened in a case where the weight becomes lighter than the measured weight of the package 3 by an amount of a preset decrease weight. Here, the preset decrease weight may be, for example, the weight of the lid 32 of the package 3.

Such a detection system 202 can easily detect that the lid 32 of the package 3 is opened based on a result of measurement of the weight sensor 203.

Figure 8:
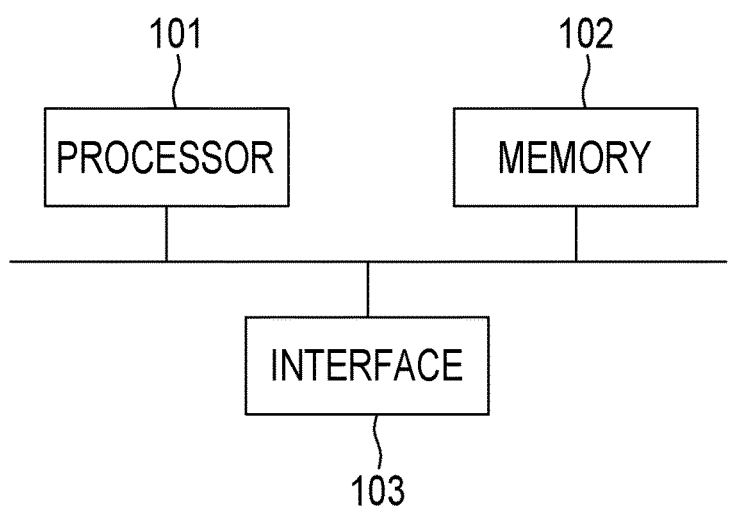
FIG. 8 is a diagram showing an example of a hardware configuration included in a detection system and a transport system.

The detection system and the transport system according to the embodiments described above can have the following hardware configuration. FIG. 8 is a diagram showing an example of the hardware configuration included in the detection system and the transport system. As described in the various embodiments described above, the description for a procedure for the process in the detection system and the transport system has been made, the present disclosure can also adopt a mode of the detection method.

The control device shown in FIG. 8 includes a processor 101 and a memory 102 as well as an interface 103. A part of the configuration of the detection system and the transport system described in the embodiments described above is realized by the processor 101 reading and executing a detection program stored in the memory 102. That is, the program is a program for causing the processor 101 function as a partial configuration of the detection system and the transport system. It can be said that the program is a program for causing the detection system and the transport system to execute the process in the configuration or a part thereof.

The program described above is stored by using various types of non-transitory computer readable medium and can be supplied to a computer (computer including an information notification device). The non-transitory computer readable medium includes various types of tangible storage media. Examples of the non-transitory computer readable medium include a magnetic recording medium (for example, flexible disk, magnetic tape, and hard disk drive) and a magneto-optical recording medium (for example, magneto-optical disk). Further, examples thereof include a compact disc read only memory (CD-ROM), a CD-R, and a CD-R/W. Further, examples thereof include a semiconductor memory (for example, mask ROM, PROM, EPROM, flash ROM, and RAM). In addition, the program may also be supplied to the computer by various types of transitory computer readable media. Examples of the transitory computer readable medium include an electric signal, an optical signal, and an electromagnetic wave. The transitory computer readable medium can supply the program to the computer via a wired communication channel, such as an electric wire and an optical fiber, or a wireless communication channel.

Incidentally, the present disclosure is not limited to the embodiments described above, and can be appropriately modified without departing from the spirit.

In the embodiments described above, the determination unit of the detection system is placed on the transport robot, but may be placed on the control device 5 or the like outside the transport robot.

What is claimed is:

1. A detection system comprising:
a transport robot;
a container having a lid, the container being carried on a placing portion of the transport robot,
wherein the detection system is configured to detect that the lid is opened; and further comprising:
an optical sensor provided on the transport robot to detect an open or closed state of the lid while the container is carried on the placing portion of the transport robot, the optical sensor comprising a light source configured to emit light and a light receiving unit configured to receive reflection light of light emitted from the light source, the reflection light being reflected by the lid; and
a determination unit configured to determine whether or not the lid is opened based on a result of detection by the optical sensor.

2. The detection system according to claim 1, wherein:
a flange portion on which the lid is placed is formed on a periphery of the opening portion of the container; and
a penetrating portion through which the emission light of the optical sensor passes is formed in the flange portion.

3. The detection system according to claim 1, comprising:
a weight sensor configured to detect a weight on the placing portion; and
a determination unit configured to determine whether or not the lid is opened based on a result of detection by the weight sensor.

4. The detection system according to claim 1, comprising a notification unit configured to, in a case where a determination is made that the lid is opened, give a notification that the lid is opened to an outside of the transport robot.

5. A transport system comprising:
the detection system according to claim 1;
the package;
the transport robot configured to transport the package; and
a control device configured to control the transport robot.

6. A detection method comprising the steps of:
placing a container having a lid on a placing portion of a transport robot;
emitting light from a light source of a n optical sensor of the transport robot; and
detecting that the lid is opened based on a result of detection of reflection light of the light emitted from the light source by a light receiving unit of the optical sensor, the reflection light being reflected by the lid, or a result of detection of a weight on the placing portion.

7. A detection program comprising non-transitory computer executable instructions stored in a memory, and when executed causing a computer to execute a process comprising detecting that a lid of a container carried on a placing portion of a transport robot is opened based on a result of detection of reflection light, the reflection light being reflected by the lid by a light receiving unit of an optical sensor of the transport robot, the reflection light being emitted by a light source of the optical sensor, or a result of detection of a weight on the placing portion.

* * * * *